United States Patent

Furukawa et al.

[15] 3,662,376

[45] May 9, 1972

[54] ANALOGUE-DIGITAL CONVERTING APPARATUS

[72] Inventors: Hikaru Furukawa, Tokyo; Hiroshi Aihara, Gyoda, both of Japan

[73] Assignee: Takeda Riken Industry Company Limited, Tokyo, Japan

[22] Filed: Apr. 7, 1970

[21] Appl. No.: 26,212

[30] Foreign Application Priority Data

Feb. 24, 2970 Japan....................................45/15184
Apr. 9, 1969 Japan....................................44/26857

[52] U.S. Cl.....................................340/347 AD, 340/347 NT
[51] Int. Cl...............................................................H03r 13/17
[58] Field of Search...............340/347 NT, 347 AP, 347 DN, 340/347 R

[56] References Cited

UNITED STATES PATENTS 3,525,093 8/1970 Marshall................................340/347
3,458,809 7/1969 Dorey..............................340/347 NT

*Primary Examiner*—Thomas A. Robinson
*Attorney*—William J. Daniel

[57] ABSTRACT

In the present invention, a quantity to be converted is integrated for a fixed time and, during the integrating period, whenever the output voltage of the integrator reached a reference level, a reference quantity having a polarity reverse to that of the quantity to be converted is added to the above mentioned integrator with the quantity to be converted.

3 Claims, 4 Drawing Figures

ANALOGUE-DIGITAL CONVERTING APPARATUS

This invention relates to analogue-digital converting apparatus.

There is a type of analogue-digital converting apparatus wherein, after an input voltage is integrated for a fixed time, a reference voltage of a reverse polarity, is then introduced into the integrator and at the same time the output frequency of the reference oscillator is counted until the integrated output reaches a fixed level, the count being representative of the magnitude of the input voltage. In such apparatus, the maximum output voltage reached by the integrator is proportional to the product of the input voltage and the above mentioned integrating time. Therefore, in order to make a more precise conversion by increasing the integrating time, it is necessary that the integrator should have an accurate linearity over a very wide operating range and a strict requirement is imposed also on the noise level. Further, the stability of the fixed level detector is also a problem and therefore generally it has been difficult to make a conversion of precision better than about 10 ppm. The present invention is to provide an apparatus in which a precision better than 0.1 ppm. can be obtained by eliminating such difficulties as are described above.

An object of the present invention is to provide an analogue-digital converting apparatus wherein a precision of at least 0.1 ppm. can be obtained.

Another object of the present invention is to provide an apparatus wherein a precise conversion can be made without having to increase the permissible maximum output voltage reached by the integrator and without having to increase the measuring time for any converted quantity over a wide input level range.

Figure 1:
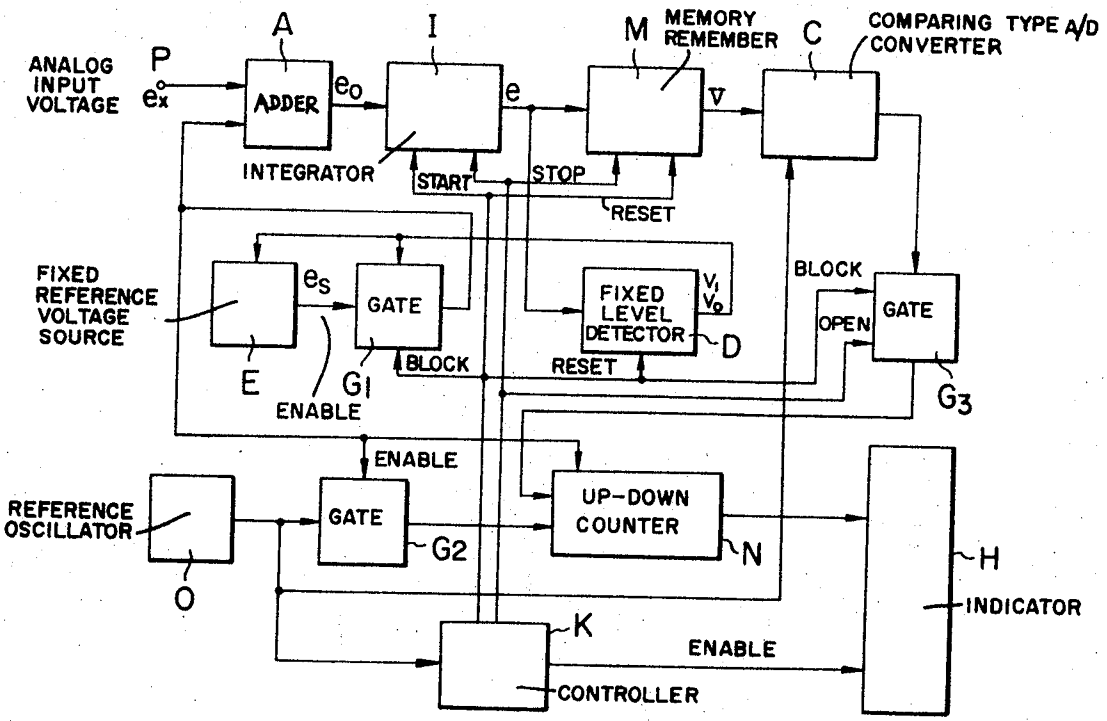
FIG. 1 is a block diagram showing an embodiment of the apparatus of the present invention.

The present invention shall be described more particularly with reference to the accompanying drawings. In FIG. 1 showing one embodiment of the present invention, when an input voltage to be converted is applied to a terminal P, an operation starting signal is applied from a controller K to enable an integrator I, to reset a memory circuit M and to reset a detector D. This same signal also closes gate circuits G1 and G3. Therefore, the voltage of the terminal P is integrated by the integrator I through an adding circuit A. When the output voltage of this integrator I reaches a fixed level as determined by the detector D, the latter then sends out a signal representing its polarity, which polarity signal is applied to a reference voltage source E and is used also to enable the gate circuit G1. In response thereto the reference voltage source E sends out a fixed voltage having a polarity reverse to that of the input voltage at the terminal P, and at the same time, the gate circuit G1 opens and applies this reference voltage to the adding circuit A. Therefore, the difference between the input voltage and reference voltage is introduced into the integrator I. As the reference voltage is selected to be large enough, the output voltage of the integrator I begins to decrease. Further, the reference voltage appearing at the output of the gate circuit G1 is applied also to enable the gate circuit G2 so that this circuit opens. Therefore, the output pulses of a reference oscillator O are applied to a counter N and said counter begins to count up the output of the oscillator O. When the output of the integrator I reduces to a predetermined level, a signal is again sent out of the detector D and the gate circuit G1 closes so that only the input voltage of the terminal P is reapplied to the integrator I. At the same time, the signal voltage enabling the gate circuit G2 also vanishes. Therefore, this gate circuit closes and the counter N stops the counting operation. The output of the integrator I again begins to increase but, when the output voltage again reaches said fixed level, a signal is again sent out of the detector D to open the gate circuit G1 and repeat the step wherein the difference between the input voltage and reference voltage is applied to the integrator I so that its output begins to decrease. Moreover at the same time, the counter N again begins to count the output frequency of the oscillator O. That is to say, the output voltage $e_1$ and the integrator input voltage $e_o$ are represented by such wave form as in FIG. 2 wherein $e_x$ is an input voltage at the terminal P, $e_s$ is a reference voltage, $t$ is a time, and $v_1$ and $v_o$ are detecting levels at which the detector D sends out signals. Further, in the periods $t_1$, $t_2$, $t_n$, during which the gate circuit G1 opens and the difference between the input voltage and reference voltage is applied to the integrator I, the counter N counts the output frequency of the oscillator O and the accumulated value is retained.

Figure 2:
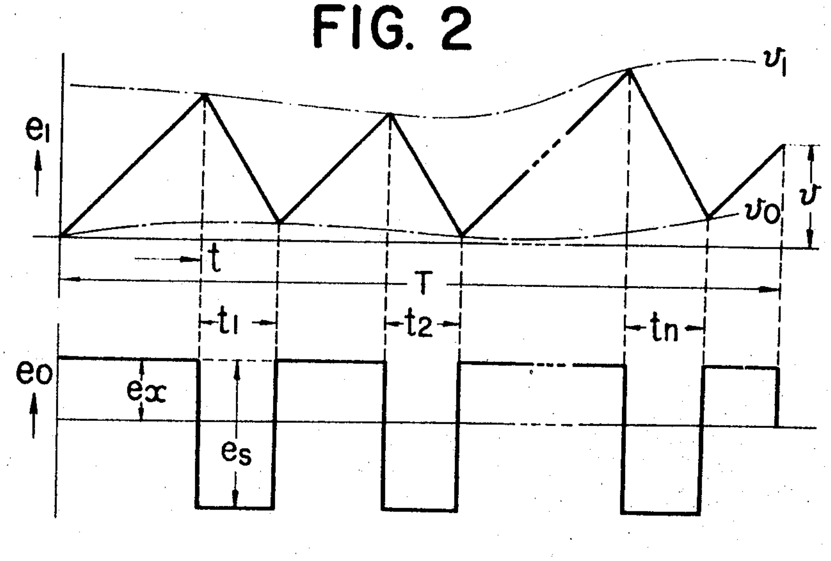
FIG. 2 is a wave form diagram for explaining the operation of the apparatus shown in FIG. 1.

The controller K measures time using the output of the oscillator and sends out a signal to stop the operation of the integrator I when a fixed time T has elapsed since the starting of the operation. This "stop" signal also actuates the memory circuit to memorize the integrated value at that time, and opens the gate circuit G3. That is to say, the memory circuit M memorizes the voltage V in FIG. 2. The output of the oscillator O is applied also to an integrating type or comparing type analogue-digital converter C and therefore this converter C converts the above mentioned voltage V to a digital quantity and sends out a number of pulses corresponding to its value. These pulses are applied to the counter N through the opened gate circuit G3. The counter N adds the pulses applied from the gate circuit G3 in the event the gate circuit G1 is not sending out an output voltage then, but it subtracts them from the counter N if the gate circuit G1 is sending out an output. That is to say, as shown in FIG. 2, at the time when a time T has elapsed after the starting of the operation, in case the output voltage of the integrator I is in a rising course as in the example of FIG. 2, an addition to the counter N is made; but, in case it is in a falling course, then a subtraction is made. After enough time elapses for this counting to be completed, an enable signal is applied to an indicator H from the controller K, and the total counted value is indicated for display. Thereafter the next operation starting signal is sent out of the controller K and a new sequence including the above described operation is repeated.

Therefore, if $f$ is the output counting frequency generated by the oscillator O, $k$ is a proportional constant and $k$V represents a number of pulses sent out of the analogue-digital converter C, the digital value $n$ indicated by the indicator H is given by $$n=f(t_1+t_2+t_n)\pm k\mathrm{V} \qquad 1.$$

Further, as $$e_x\mathrm{T}-e_s(t_1+t_2+t_n)=\pm\mathrm{V},$$
$$e_x=e_s/\mathrm{T}\ (t_1+t_2+t_n)\pm\mathrm{V}/\mathrm{T} \qquad 2.$$

holds. Therefore, if $\mathrm{T}=e_s/f$ and $k=f/e_s$, $$e_x=n \qquad 3.$$

Thus the input voltage $e_x$ is represented by the counted value $n$.

Therefore the operating range of the integrator may be made very small. Moreover this integrator can be operated in a way to provide linearity which is very favorable. At the same time, the requirement for the noise level can be relaxed. In the digital measurement of time, a precision above $10^{-8}$ can be easily obtained. That is to say, the first term of the above mentioned first formula (1) can be easily counted to achieve a precision of 0.5 ppm. Further, the counted value of the second term $k$V can be made so small as to be, for example, below 1 percent of the total counted value $n$. Therefore, even if the conversion precision of the analogue-digital converter C is made to be accurate within a certain number of ppm., the entire conversion precision can be kept at 0.5 ppm. as described above. Further, even in a case where the detecting level $V_1$ and $V_0$ of the detector D fluctuate greatly as shown in FIG. 2, the conversion precision is not influenced. Therefore, it is very easy to manufacture and maintain the apparatus.

According to another embodiment of the present invention, an input quantity to be converted is integrated for a fixed time and, during the integrating time, whenever the output voltage of an integrator reaches a reference level, a reference quantity having a polarity opposite to that of the input quantity to be converted is added to the above mentioned integrator together with the quantity to be converted.

This embodiment shall be explained with reference to FIGS. 3 and 4.

Figure 3:
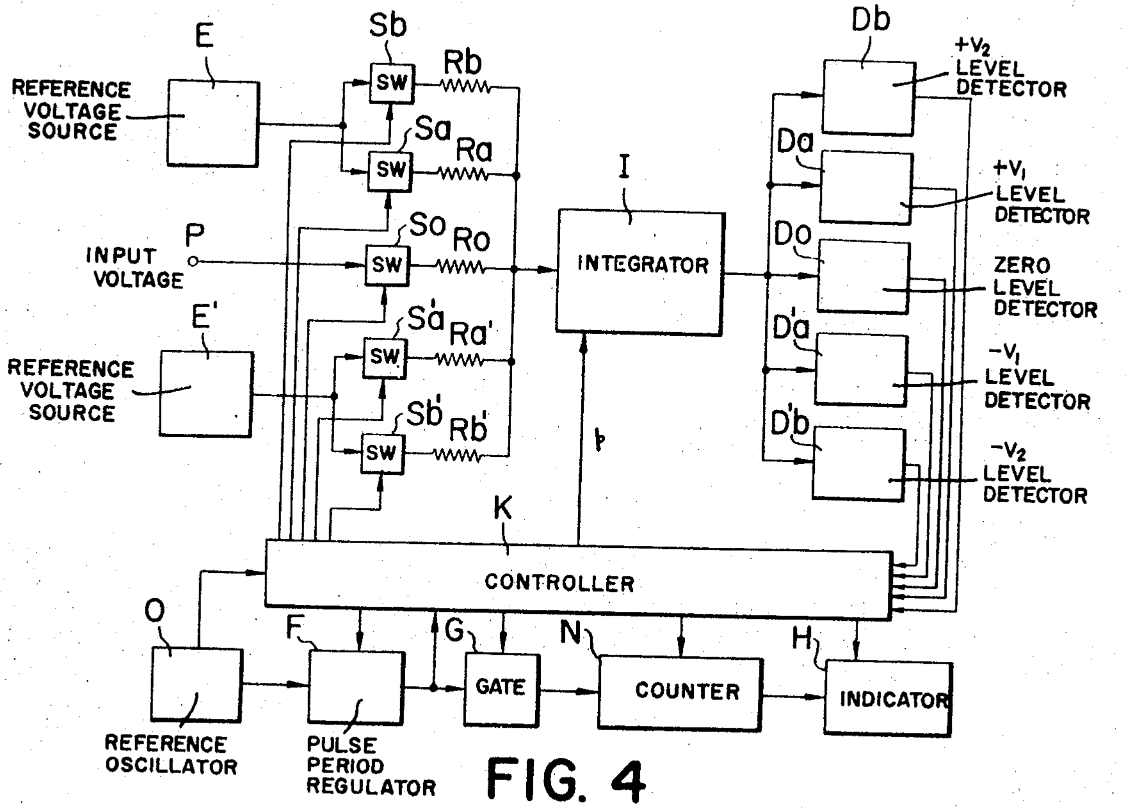
FIG. 3 is a block diagram showing another embodiment of the apparatus of the present invention.
Figure 4:
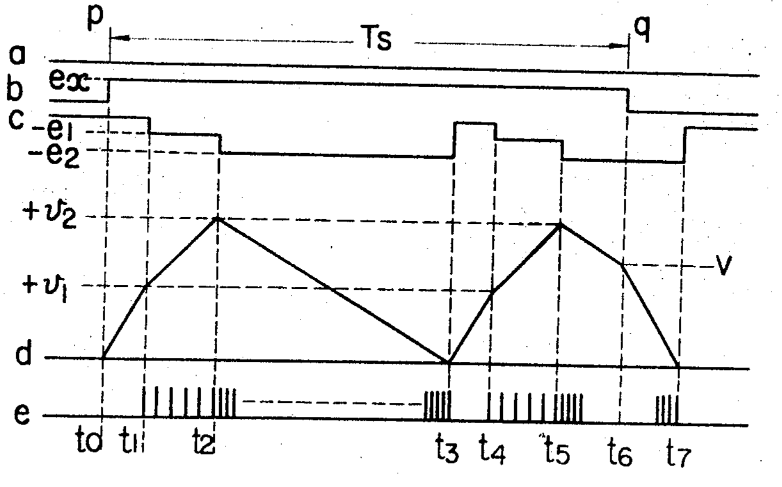
FIG. 4 is a wave form diagram for explaining the operation of the apparatus shown in FIG. 3.

In FIG. 3 showing a block diagram of an embodiment of the present invention, a controller K sends out signal pulses $p$ and $q$ spaced by a fixed time interval $T_s$ shown on line a in FIG. 4. The controller accomplishes these time intervals by dividing the period of the output of a reference oscillator O. An integrator I and counter N are enabled from the reset state by the pulse $p$ and at the same time the switch $S_o$ is closed by this pulse. Therefore, if a direct current voltage representing input quantity to be converted is applied to a terminal P, the current flowing through a resistance $R_0$ due to this voltage is integrated by the integrator I. Further, at the moment when the switch $S_0$ is opened by the signal pulse $p$, such input voltage to be converted as shown on line $b$ in FIG. 4 begins to be applied to the integrator I through the resistance $R_0$. That is to say, the converting operation is started at the time $t_o$ by the generation of the pulse P, but, in its initial period, the switches $S_a$, $S_b$ and $S_a'$, $S_b'$ are all blocked and therefore, the outputs of reference voltage sources E and E' are not added to said integrator as shown on line $c$ in FIG. 4. Hence the output voltage of this integrator I linearly increases in a direction corresponding to the polarity of the input voltage, the integration having a comparatively steep slope as shown on line $d$ in FIG. 4. One of the level detectors $D_a$ or $D_a'$ sends out a signal when this integrated voltage reaches a predetermined reference voltage $+V_1$ or $-V_1$. Thereupon, in the case shown in the drawing, at a time $t_1$, a signal is applied from the detector $D_a$ to the controller K. The controller K closes the switch $S_a$ in response to this signal, and therefore the output voltage of the reference voltage source E is applied to the integrator I together with the input voltage of the terminal P through a resistance $R_a$. Since its reference voltage $-e_1$ has a polarity opposite to that of the input voltage on line $b$ in FIG. 4, then as shown on line $c$ in FIG. 4, if the resistances $R_o$ and $R_a$ are equal to each other and the input voltage $e_x$ is larger than the reference voltage $e_1$ in absolute value, then the output voltage of the integrator I further continue to increase but its slope will become more gradual. Conversely, in the event that the detector $D_a'$ should send out a signal, the switch $S_a'$ closes, the output voltage from the reference voltage source E' would be applied to the integrator I through a resistance $R_a'$ and, as in the above described case, this reference voltage have a polarity opposite to that of the input voltage. In either case, at the time $t_2$, when the output voltage of the integrator I reaches a reference level $+V_2$ ( or $-V_2$ ), another signal is applied to the controller K from the appropriate level detector $D_b$(or $D_b'$), and this signal actuates the controller K to close the switch $S_b$ ( or $S_b'$ ) so that the output voltage of the reference voltage source E ( or E' ) is further applied to the integrator I through a resistance $R_b$ ( or $R_b'$ ). Therefore, the reference voltage applied to the integrator I increases substantially to $-e_2$ but, if the absolute value of this voltage $-e_2$ is larger than that of the input voltage, the integrator I begins to decrease as shown in $d$ in FIG. 4 and reaches the initial reference level existing at the time of starting the integration at a time $t_3$. Then a signal is applied to the controller K from the level detector $D_o$, and the switches $S_a$ and $S_b$ are opened in response thereto. Therefore, only the input voltage at the terminal P is being applied to the integrator I and its output voltage again begins to increase at a steep rate as at line $d$ in FIG. 4. Subsequently, at a time $t_4$, the output of the integrator I again reaches the level $v_1$, and therefore a signal is sent out of the detector $D_a$, in response to which the switch $S_a$ closes and said input voltage together with an output voltage $-e_1$ from the reference voltage source E are again applied to said integrator. Further, at a time $t_5$, the output voltage of the integrator reaches a level $v_2$, whereupon a signal is sent out of the detector $D_b$ and the switch $S_b$ closes so that the output voltage of the integrator I begins to decrease. As such operation is repeated, when at a time $t_6$ the signal pulse $q$ is generated, the switch $S_o$ opens and the input voltage applied to the integrator I vanishes. Now the switches $S_a$ and $S_b$ are always closed by the pulse $q$, and thereafter irrespective of said pulse generating time, only the output of the reference voltage source E is applied to the integrator I, and its output voltage quickly decreases and returns to the reference level at the time of starting the integration. When this occurs at a time $t_7$, a signal is sent out of the zero level detector $D_o$.

In the above, the operation of the integrator I has been explained with reference to waveforms appearing on lines $a$, $b$, $c$ and $d$ in FIG. 4. At the times $t_1$, $t_4$, etc., when the detector $D_a$ sends out a signal, the controller K applies a signal to a pulse rate regulator F from the controller K. Therefore, the regulator F divides the rate of output of the reference oscillator O and sends out a pulse train of a period of 2 $\tau$, for example, in the case where the resistances $R_a$ and $R_b$ are equal to each other. After a signal is applied from the detector $D_a$, the controller K opens the gate circuit G with the next succeeding output pulse of the regulator F. Therefore, the counter N begins to count pulses of a period of 2 $\tau$. However at the next times $t_2$, $t_5$, etc., when a signal is sent out of the detector $D_b$, the controller K applies a signal to the pulse rate regulator F and decreases the period of the output pulses to $\tau$ instead of $2\tau$. Further, at the times $t_3$, $t_7$, etc., when the detector $D_o$ sends out a signal, the controller K closes the gate circuit G synchronously with output pulses of the regulator F occurring just after the signal. That is to say, the counter N counts such pulse train as is shown at line $e$ in FIG. 4 and, when a fixed time has elapsed after the generation of the pulse $q$, the controller K applies a signal to the indicator H to display the result $n$ of the counting.

In the above described operation, assuming that V is an output voltage of the integrator I at the time of the generation of the pulse $q$, $T_1$ is a time interval during which a reference voltage $e_1$ is applied to the integrator between the pulses $p$ and $q$, $T_2$ is a time during which a reference voltage $e_2$ is applied and $k$ is a suitable constant, $$V=k(e_xT_s - e_1T_1 - e_1T_1 - e_2T_2) \qquad 1.$$

holds. Further, if $T_3$ is a time interval during which the reference voltage $e_2$ is applied after the generation of the pulse $q$, $$V=k\, e_2\, T_3 \qquad 2.$$

holds. Therefore, $$e_x=1/T_s\, \{e_1T_1 + e_2\, (T_2+T_3)\} \qquad 3.$$

Moreover, if $n_1$ is a number of counted pulses in a period of 2 $\tau$ and $n_2$ is a number of pulses in a period of $\tau$, as the times $T_1$ and $(T_2+T_3)$ are respectively $2\tau n$, and $\tau n_2$, $e_x$ is given by $$e_x=1/T_s\, (2\, e_1\, \tau n_1 + e_2\, \tau\, n_2) \qquad 4.$$

Further, if the integrated resistances $R_0$, $R_a$ and $R_b$ are equal as described above, $$e_2=2e_1 \qquad 5.$$

Therefore, $$e_x=(2e_1\tau)/(T_s)\, (n_1+n_2)$$
$$=(2\, e_1\, \tau)/(T_s)\, n \qquad 6.$$

Thus, the input voltage $e_x$ of the quantity to be converted is converted to a digital quantity $n$ indicated by the indicator H.

As described above, in the present invention, a quantity to be converted is integrated for a fixed time and, during the integrating period, whenever the output voltage of the integrator reaches a reference level, a reference quantity having a polarity reverse to that of the quantity to be converted is added to the above mentioned integrator together with the quantity to be converted. Further, plural reference levels are provided so that, whenever the output of the integrator reaches one level, the reference level is increased. Therefore, even in case the quantity to be converted is quite large, there is no disadvantage of the type wherein the over-all measuring time greatly increases, or wherein the allowable output level of the integrator must be selected to be very large. Thus the linearity can be improved. That is to say, the measuring precision is determined by the integrating time $T_s$ of the quantity to be converted. Assuming that $V_x$ is a voltage remaining at time $t6$ in FIG. 4 to be converted during the time $T_s$, in a conventional apparatus it is necessary that the allowable output voltage of the integrator should be naturally above $V_x$. In such case, where a quantity is to be converted which is smaller than the reference quantity, a detecting level of one step must be provided so that, when the output of the integrator reaches that level, a reference quantity of a polarity reverse to that of the quantity to be converted may be added to the quantity to be converted when it is integrated. Therefore, the allowable output voltage of the integrator can be reduced to the above mentioned detecting level. However, if a quantity is to be converted which is twice as large as the reference quantity which is added, even in case the detecting level is selected to be much smaller than the above mentioned voltage $V_x$, the allowable output voltage of the integrator can be only decreased to about $V_x/2$. On the other hand, when plural detecting levels having different steps are provided, and where the reference voltage level is varied in response to the input level to be converted, the upper limit on the output voltage of the integrator can be made very small. Further, since the pulse counting time is long enough even for a low-level input quantity to be converted, a precise measurement can be made by properly selecting and changing over the period of the counting pulses. Moreover, in prior-art circuitry when the gate circuit at the input end of the counter is opened and closed independently of the counting pulses, an error of ± 1 digit is produced in the counted value for the time interval whenever it is opened and closed and therefore such errors are likely to accumulate. However, as explained with reference to the embodiment, when the gate circuit is opened and closed synchronously with the counting pulses, the possibility that errors of ± 1 digit may accumulate is prevented.

What is claimed is:

1. An analog-digital converting apparatus comprising, integrator means; input means; reference voltage means; level detecting means having means for detecting levels at the output of the integrator means; controller means operative alternately to introduce into the integrator means voltage from the input means, and responsive to the integrator reaching a first fixed level to add to the input voltage an opposing reference voltage from said reference voltage means to bring the integrator level down toward a second level; a source of counting pulses; digital counting means operative to count said pulses during intervals while the integrator means is integrating the input voltage together with the opposing reference voltage to accumulate a first digital quantity; means for converting a residual level of the integrator means to a second digital quantity, said controller means being operative after a fixed time has elapsed to apply the existing residual integrator level to said converting means; and means including said counting means to combine said first and second digital quantities to obtain a digital output.

2. An analog-digital converting apparatus comprising, integrator means; input means, reference voltage means operative to deliver at least two reference voltages of different levels; level detecting means for detecting levels at the output of the integrator means; controller means operative to introduce into the integrator means voltage from the input means, and responsive to the integrator reaching certain levels as determined by said detecting means to add to the input voltage opposing reference voltages from said reference voltage means to bring the integrator level down toward its initial starting level; a source of counting pulses having at least two different pulse rates proportioned as said different reference voltage levels; and digital counting means operative to count pulses during integration only when a reference voltage is being integrated, the pulse counting rate being determined by the level of a reference voltage being integrated; said controller means being operative after a fixed time has elapsed to remove the input voltage from the integrator means while coupling the references voltages thereto and count the counting pulses until the integrator level reaches its initial starting level.

3. In an analog-digital converting apparatus as set forth in claim 2, gate means for coupling said counting pulses to said counting means, said gate means and said controller means being actuated synchronously by said counting pulses respectively to open the gate means while adding to the integrator input corresponding reference voltage levels.

* * * * *